(12) United States Patent
Dahl et al.

(10) Patent No.: US 11,318,644 B2
(45) Date of Patent: May 3, 2022

(54) SYSTEM AND PROCESS FOR PRODUCING A COMPOSITE ARTICLE

(71) Applicant: Ford Global Technologies, LLC, Dearborn, MI (US)

(72) Inventors: Jeffrey Scott Dahl, Livonia, MI (US); Michael Cacovic, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1026 days.

(21) Appl. No.: 15/625,295

(22) Filed: Jun. 16, 2017

(65) Prior Publication Data
US 2017/0282441 A1    Oct. 5, 2017

Related U.S. Application Data

(62) Division of application No. 14/095,075, filed on Dec. 3, 2013, now abandoned.

(51) Int. Cl.
*B29C 65/00* (2006.01)
*B29C 43/20* (2006.01)
(Continued)

(52) U.S. Cl.
CPC ............ *B29C 43/203* (2013.01); *B29B 11/16* (2013.01); *B29C 66/8322* (2013.01); *B29C 70/42* (2013.01); *B29C 65/08* (2013.01); *B29C 65/7802* (2013.01); *B29C 65/7841* (2013.01); *B29C 65/7847* (2013.01); *B29C 65/7891* (2013.01); *B29C 66/1122* (2013.01); *B29C 66/21* (2013.01); *B29C 66/41* (2013.01); *B29C 66/71* (2013.01); *B29C 66/721* (2013.01); *B29C 66/73921* (2013.01); *B29C 66/73941* (2013.01); *B29C 2043/3266* (2013.01);
(Continued)

(58) Field of Classification Search
CPC ......... B29C 65/00; B29C 65/08; B29C 65/70; B29C 65/78; B29C 65/7802; B29C 65/7841; B29C 65/7847; B29C 65/7858; B29C 65/7861; B29C 65/7864; B29C 65/7867; B29C 65/787; B29C 65/7876; B29C 65/7879; B29C 65/7882; B29C 65/7885; B29C 65/7888; B29C 65/7891; B29C 65/7894; B29C 65/80
See application file for complete search history.

(56) References Cited

U.S. PATENT DOCUMENTS 5,209,804 A * 5/1993 Trudeau ................. B65H 3/122
156/364
5,875,614 A * 3/1999 Youngs .................. B29C 65/08
53/254

(Continued)

FOREIGN PATENT DOCUMENTS

DE    19818379    10/1999

*Primary Examiner* — Jacob T Minskey
*Assistant Examiner* — Matthew Hoover
(74) *Attorney, Agent, or Firm* — Burris Law, PLLC

(57) ABSTRACT

A method of producing a composite article is disclosed that includes generating composite plies from a low tack composite prepreg material, connecting, by an ultrasonic welding device, two or more of the composite plies by increasing their tackiness to form a composite stack, and forming, by a compression molding device, a composite article from the composite stack.

20 Claims, 2 Drawing Sheets

Figure 1:
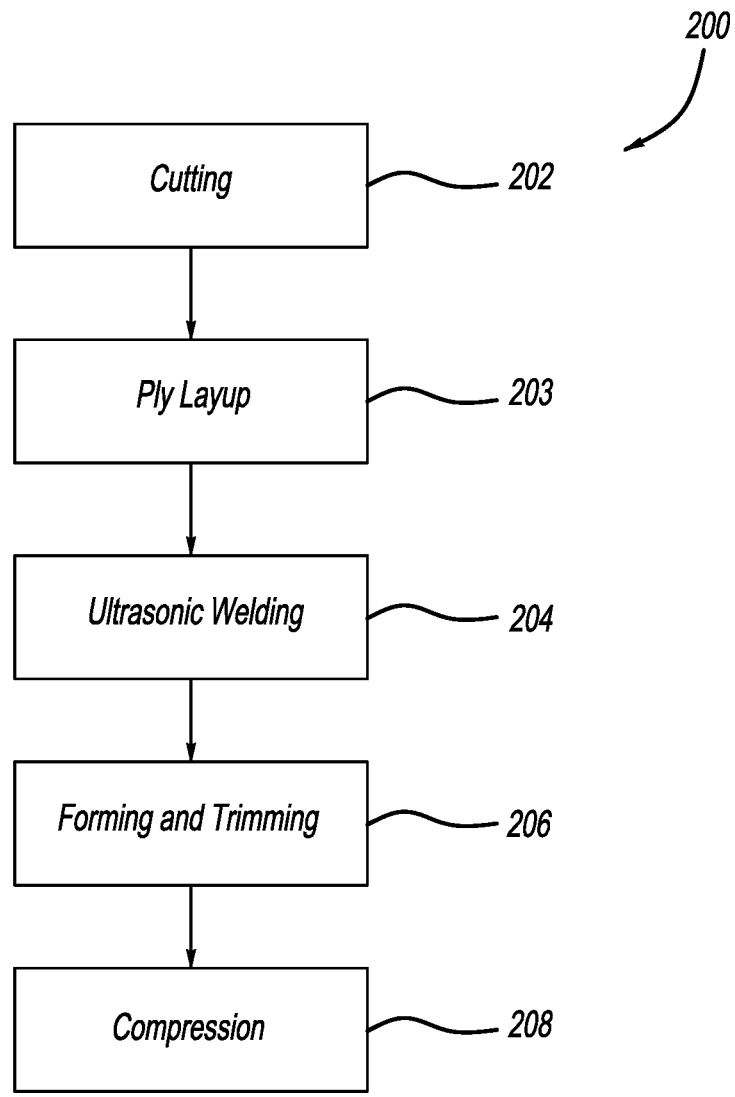

(51) Int. Cl.
    *B29C 70/42*     (2006.01)
    *B29B 11/16*     (2006.01)
    *B29C 65/08*     (2006.01)
    *B29L 9/00*     (2006.01)
    *B29C 43/32*     (2006.01)
    *B29C 43/36*     (2006.01)
    *B29C 65/78*     (2006.01)
    *B29K 55/02*     (2006.01)

(52) U.S. Cl.
    CPC ............ *B29C 2043/3636* (2013.01); *B29C 2793/0081* (2013.01); *B29K 2055/02* (2013.01); *B29L 2009/00* (2013.01)

(56) References Cited

U.S. PATENT DOCUMENTS

| | | | |
|---|---|---|---|
| 5,954,898 A * | 9/1999 | McKague | B29C 70/345 156/64 |
| 8,168,029 B2 * | 5/2012 | Cramer | B29B 11/16 156/265 |
| 2001/0011570 A1 * | 8/2001 | Roylance | B29C 66/81417 156/73.1 |

* cited by examiner

SYSTEM AND PROCESS FOR PRODUCING A COMPOSITE ARTICLE

CROSS-REFERENCE TO RELATED APPLICATIONS

This application is a divisional of and claims priority to U.S. patent application Ser. No. 14/095,075, filed on Dec. 3, 2013. The disclosure of the above application is incorporated herein by reference.

FIELD

The disclosed inventive concept relates generally to system and method for producing a composite article.

BACKGROUND

In certain existing methods, relatively high tack pre-impregnated fiber materials (or "prepreg materials") are cut to two dimensional patterns using a table cutting machine. Upon completion of the cutting process, the resultant prepreg plies are removed manually and stored for manufacture of composite parts. Some of the existing prepreg materials tend to contain carrier films on both sides to separate from each other. This is necessary as these relatively high tack prepreg plies tend to stick to each other and be rendered useless if not properly separated. An issue associated with this existing practice is carrier films must be removed for subsequent processes and removal of carrier films can be labor intensive and cost inefficient.

These issues with forming composite parts are addressed by the present disclosure.

SUMMARY

As will be detailed below, the present invention in one or more embodiments is advantageous at least in that two dimensional prepreg blank geometries can be cut from relatively low tack prepregs on a two dimensional cutting table. Due to the relatively low tack, the prepreg material can be readily separated from each other with or without carrier films. The blanks can be robotically removed from the cutting table, optionally using vacuum pick and place technology. The blanks can then be aligned and connected optionally via ultrasonic welding in preparation for downstream forming and/or compression treatment.

According to one or more embodiments, a system includes a cutter for cutting a composite material such as the relatively low tack prepregs to form composite pieces, an ultrasonic welding device for connecting two or more of the composite pieces to form a composite stack, and a compression molding device for forming a composite article from the composite stack. system may further include a transfer arm for delivering the composite pieces to the ultrasonic welding device. The system may further include a forming device to generate a composite preform which is then delivered to the compression molding device. This is particular for the so called net-shape molding where the composite perform is produced by heat assisted forming and trimming to remove unnecessary excess materials, and the composite perform is then ready for molding where no trimming is necessary any more with the molding. The system may further include a trimmer to trim excess materials from the composite preform to generate a trimmed composite preform which is then delivered to the compression molding device.

According to one or more other embodiments, a method producing a composite article includes subjecting a composite material such as the relatively low tack prepregs to a cutter to form composite pieces, subjecting two or more the composite pieces to an ultrasonic welding device for connecting two or more of the composite pieces to form a composite stack, and subjecting the composite stack to a compression molding device to form a composite article from the composite stack.

The above advantages and other advantages and features will be readily apparent from the following detailed description of embodiments when taken in connection with the accompanying drawings.

DRAWINGS

Figure 2:
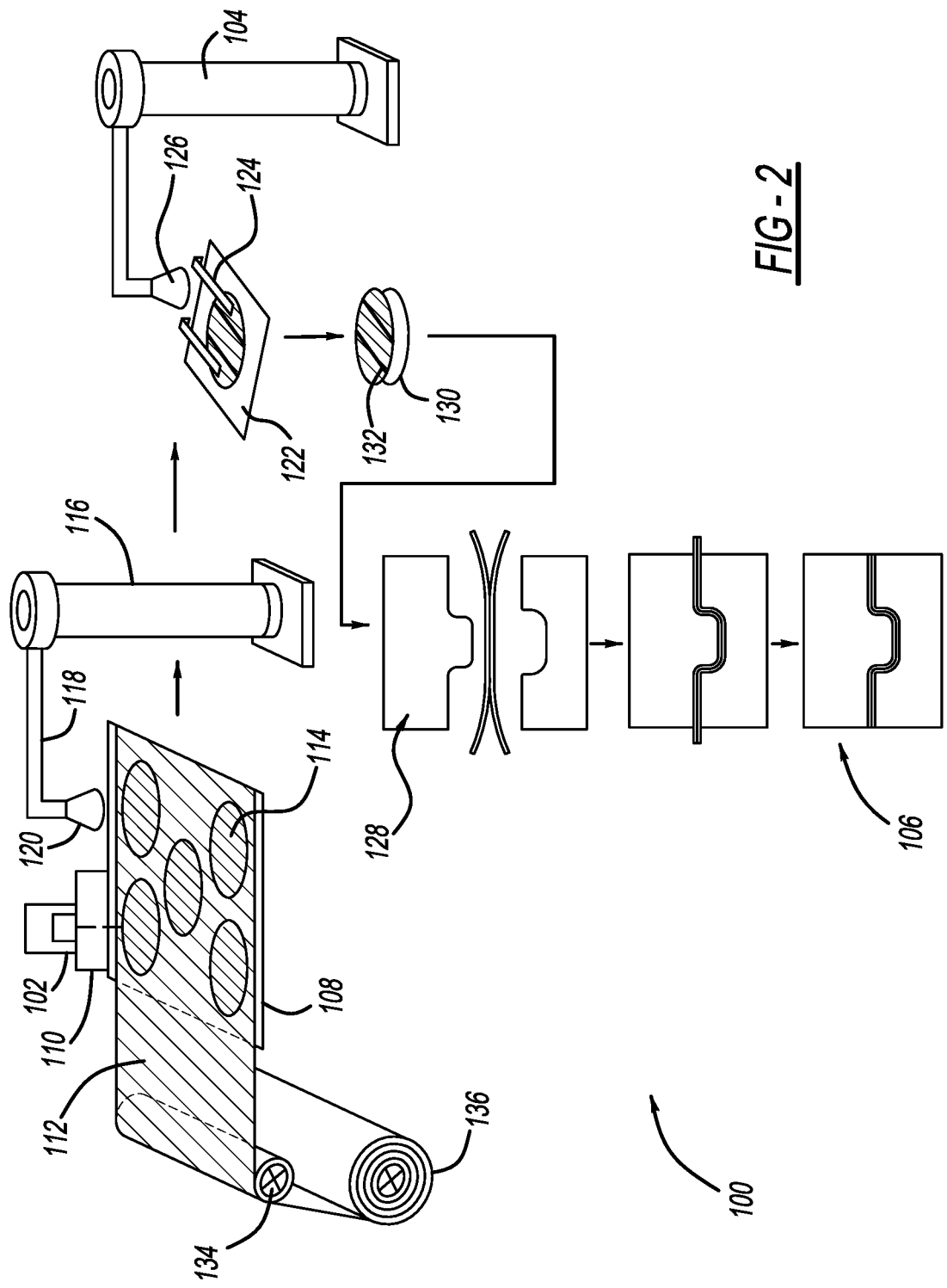

For a more complete understanding of embodiments of this invention, reference should now be made to the embodiments illustrated in greater detail in the accompanying drawings and described below by way of examples wherein:

FIG. 1 depicts a system for forming a composite article according to one or more embodiments; and FIG. 2 depicts a non-limiting process for forming the composite article referenced in FIG. 1.

DETAILED DESCRIPTION

As referenced in the figures, the same reference numerals are used to refer to the same components. In the following description, various operating parameters and components are described for different constructed embodiments. These specific parameters and components are included as examples and are not meant to be limiting.

According to one or more embodiments, and as depicted in FIG. 1 in view of FIG. 2, a system generally shown at 100 includes a cutter 102 for cutting a composite material 112 shown at step 202 to form composite pieces 114, an ultrasonic welding device 104 for connecting two or more of the composite pieces 114 shown at step 204 to form a composite stack 130, and a compression molding device 106 for forming a composite article from the composite stack 130 shown at step 208. A forming step 206 may be included to provide a net shaped perform via forming and trimming. In addition, and as detailed herein elsewhere, step 203 may be included to provide ply layup in which the two or more composite pieces 114 may be aligned, optionally via a robot, for step 204.

The composite stack 130 may be provided with one or more of welding areas 132 where a horn 126 of the ultrasonic welding device 104 contacts the composite stack 130. By such a contact, the ultrasonic energy is transferred onto the composite stack 130 to effect the welding. The welding areas 132 may vary in location and/or number. The welding areas 132 may take any suitable shapes, including spots, lines and/or bars. The two or more composite pieces 114 underlining the composite stack 130 are connected via the welding areas 132. The welding areas 132 help maintain alignment of individual composite pieces 114 and function to hold them together to facilitate the downstream forming and compression steps.

Referring back to FIG. 1, the system 100 may further include a transfer arm 118 for delivering the composite pieces 114 to the ultrasonic welding device 104. The transfer arm 118 may be actuated by a robot 116 and in some instances, may be part of the robot 116. The transfer arm 118 may include a receiving end 120 coupled with a number of vacuum cups (not shown) for picking up and dropping off the composite pieces 114. Accordingly the composite pieces 114 may be aligned back-to-back via the use of the robot 116 and the transfer arm 118. The receiving end 120 may be of any suitable shape and be made of any suitable material. In certain instances, the receiving end 120 may be of a generally flat surface with the vacuum cups positioned thereupon.

Referring back to FIG. 1, the ultrasonic welding device 104 may include a platform 122 for receiving the composite pieces 114. The platform 122 may be built as part of the ultrasonic welding device 104 or may be positioned separable and detachable to the ultrasonic welding device 104. The platform 122 may include another number of vacuum cups (not shown) to receive and stabilize the composite pieces 114 placed thereupon. One or more stabilizing arms 124 may also be provided to assist with the positioning and stabilization of the composite pieces 114. The stabilizing arms 124 may be part of the ultrasonic welding device 104 and/or part of the platform 122.

When a third composite piece 114 is placed onto the first two that have been welded, the horn 126 descends and welds the third composite piece to the second composite sheet 114. Dependent upon the ultrasonic energy transferred, the welding bonds between the third and second pieces may not necessarily be confined within the second and/or third sheet, and therefore may go into the first piece. In addition, the horn 126 may be repositioned such that the welding lines/spots between the first and the second, and the welding lines/spots between the second and the third may be different. This is particularly useful when the composite pieces 114 may be of different shapes among themselves.

The horn 126 may be designed to resonate at the frequency of the ultrasonic system. Therefore the ultrasonic energy as imparted from the horn 126 may be varied by adjusting the resonance frequency of the ultrasonic system.

The ultrasonic welding imparts local "stitching" to one or more of the composite sheets 114. Without wanting to be limited to any particular theory, it is believed that ultrasonic welding works to reduce viscosity of the composite pieces 114 locally and renders these locations of the composite pieces 114 tackier. Ultrasonic vibrational energy causes the material to soften and flow in a fraction of a second. When the material is pressed together and resolidifies, the bond is made. No glues or solvents are needed. Heating is confined to the interface area so the assembled part is not too hot to handle. The energy and/or temperature as imparted by the ultrasonic welding should be low enough so as not to impair any downstream steps including, for instance, forming at step 206 and compression at step 208. If too much energy is delivered prior to forming, the composite pieces 114 may become rigid at these high energy imparted locations. These high energy imparted locations may render the composite pieces 114 not flexible enough to conform to certain desirable shapes at or near those high energy imparted locations.

The ultrasonic welding at step 204 may be plunge welding. In plunge welding, the composite pieces 114 are placed under the horn 126; the horn 126 descends to the composite pieces 114 under moderate pressure and the weld cycle is initiated.

As discussed herein elsewhere, any two composite pieces 114 may be placed on the platform 122 prior to ultrasonic welding. In general, no additional force is required to compress the composite pieces 114. This is at least because the composite pieces 114 should not fit too tightly as over-tight joining may inhibit the vibration needed to induce welding.

The composite material 112 may be thermoplastic or thermoset. Under certain instances, the thermoplastics tend to be less tacky than thermoset materials. When being thermoset, the composite material 112 can behave like thermoplastic under room temperatures so as to be responsive to ultrasonic welding. A non-limiting method to accomplish this may be via increasing the uncured material temperature above the corresponding glass transition temperature such that viscosity may be reduced and the matrix is allowed to flow under the heat with the reduced viscosity.

Although the method described herein may be adapted to be used for composite material of relatively high tackiness under limited circumstances, the method described herein is particularly suitable for composite material 112 that is of relatively low tackiness. When too tacky, the composite pieces 114 would stick to each other and become almost inseparable. Unacceptable tackiness will make the piece-by-piece transfer for the ultrasonic welding accordingly almost impossible.

Thermoplastics can be further categorized as amorphous or crystalline. Amorphous resins exhibit random and do not greatly dampen energy introduced into the material. As heat is applied, they soften and do not have a sharply defined melting temperature. Amorphous resins include ABS, acrylic, polycarbonate, polystyrene and polysulfone. Crystalline resins have an orderly pattern, like coiled springs. Just as metal springs dampen vibration, so do crystalline materials. They also have a well-defined melting temperature. Crystalline materials include acetal, nylon, polyester, polyethylene, polypropylene and polyphenylene sulfide. Alloys/blends are combinations of amorphous and/or crystalline polymers and the combinations seem endless.

In certain instances, the composite material 112 may be a material otherwise termed "pre-preg." As mentioned herein elsewhere, pre-preg is a term for "pre-impregnated" composite material where a resin is included to bond a matrix material together. The resin may or may not be partially cured to allow easy handling.

Referring back to FIG. 1, the cutter 102 may be positioned in connection to a cutting table 108. During a cutting operation, the cutter 102 may be moved in one or more desirable directions via the support frame 110 to deliver the cutting.

Referring back to FIG. 1, the composite material 112 may be provided as a roll wound about a roller 134. The composite material 112 may optionally be separated from each other via one or two carrier films (not shown). In the event the carrier film is used, the carrier film may be retained and prevented from going onto the cutting table 108 via a second roller 136 or alternatively a stop. The second roller 136 or the stop rolls to pull the carrier film away from the composite material 112.

Referring back to FIG. 1, the system 100 may further include a forming device 128 to generate a composite preform which is then delivered to the compression molding device 106. Forming at step 206 may be a necessary step prior to the compression/curing step 208. To assist with the forming, the ultrasonically welded pieces 114 may be pre-heated. The pre-heating step may also help maintain the shape following the forming step.

During forming and trimming, ultrasonically welded pieces 114 are formed using male/female shape tooling to obtain the ultimate product shape. Excess edging materials are trimmed off according to step 206. The forming does not necessarily reduce the total thickness of the composite pieces 114. But the trimming may be necessary as the cavity of the compression mold 106 is often particularly sized. The excess material would not make the sheets fitting well within the mold cavity.

Formed part coming out of step 206 may deform over time as they are not cured. The final compression and curing may occur at step 208 under elevated pressure and/or temperature.

As described herein elsewhere, the composite material 112 is of relatively low tack. The relatively low tackiness of the composite material may be realized using any suitable methods. A non-limiting example of such methods includes selecting a source resin with a temperature glass transition temperature to be near or above ambient temperature. Another non-limiting example of such methods includes selecting a source resin which is a combination of solid and liquid resins for forming the composite material.

For certain existing systems and processes, relatively high tackiness would be helpful during a manual layup, wherein the tack allows the pieces to stick together and maintain position for subsequent manual layup of plies. Therefore the present invention in one or more embodiments presents a departure from some of the existing practices favoring the use of resin materials of relatively high tack. As detailed herein elsewhere, the use of relatively low tack materials effectuates the employment of robotic handling instead of manual handling, which further effectuates the employment of ultrasonic welding to impart localized welding connections. Exposing someone near an ultrasonic operation such as the ultrasonic welding device 104 may not be that practice for health consciousness reasons; the use of relatively less tacky materials coupled with robotic handling reduces or eliminates such health risk to an operator as he or she can be positioned remotely from the ultrasonic source during operation.

The composite material 112 may come in rolls, optionally separated with one sheet of packaging film such as paper. When provided as a sheet, the composite material 112 may be conveyed underneath the cutter 102 and cut into sizes of predetermined shapes. Because of the relatively low tackiness, the composite pieces 114 as cut are not unacceptably tacky on either side and may be stacked onto each other along a thickness direction.

The term "composite" or "composite material" may refer to materials made from two or more constituent components with different physical or chemical, that when combined, produce a material with characteristics different from the individual components. The individual components often remain separate and distinct within the finished structure. The new material may be preferred for many reasons: common examples include materials which are stronger, lighter or less expensive when compared to traditional materials.

In one or more embodiments, the disclosed invention as set forth herein overcomes the challenges faced by known production of composite articles. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A method of producing a composite article, the method comprising:
   generating composite plies from a composite prepreg material;
   connecting, by an ultrasonic welding device, two or more of the composite plies by increasing their tackiness to form a composite stack; and
   transferring the composite stack to a compression molding device and forming a composite article from the composite stack with the compression molding device.

2. The method of claim 1, wherein the generating composite plies includes cutting, by a cutter, the low tack composite prepreg material to form the composite plies.

3. The method of claim 1 further comprising transferring the composite plies to the ultrasonic welding device via a transfer arm.

4. The method of claim 1 further comprising stabilizing one or more of the composite plies prior to connecting the composite plies.

5. The method of claim 1 further comprising separating the low tack composite prepreg material from a carrier film prior to generating the composite plies.

6. The method of claim 1, wherein the connecting the two or more of the composite plies further includes resonating, by the ultrasonic welding device, ultrasonic energy at one or more predetermined locations of the composite plies to connect the composite plies at the one or more predetermined locations.

7. The method of claim 1 further comprising generating a composite preform from the composite stack via a forming device.

8. The method of claim 7 further comprising trimming excess materials from the composite preform via a trimmer to generate a trimmed composite preform that is used, by the compression molding device, to form the composite article.

9. A method of producing a composite article, the method comprising:
   cutting a composite material to form composite plies, the composite material being prepreg material;
   connecting, by an ultrasonic welding device, two or more of the composite plies by increasing their tackiness to form a composite stack; and
   transferring the composite stack to a compression molding device and forming a composite article from the composite stack with the compression molding device.

10. The method of claim 9 further comprising delivering the composite plies to the ultrasonic welding device via a transfer arm.

11. The method of claim 9 further comprising stabilizing one or more of the composite plies prior to connecting the composite plies by the ultrasonic welding device.

12. The method of claim 9 further comprising separating the composite material from a carrier film prior to cutting the composite material.

13. The method of claim 9, wherein the connecting the two or more of the composite plies further includes resonating, by the ultrasonic welding device, ultrasonic energy at one or more predetermined locations of the composite plies to connect the composite plies at the one or more predetermined locations.

14. The method of claim 9 further comprising generating a composite preform from the composite stack via a forming device.

15. The method of claim 14 further comprising trimming excess materials from the composite preform via a trimmer to generate a trimmed composite preform used, by the compression molding device, as the composite stack for forming the compression stack.

16. A method of producing a composite article, the method comprising:

subjecting a composite material to a cutter to form composite plies, the composite material being prepreg material;

radiating, by an ultrasonic welding device, two or more of the composite plies with ultrasonic energy to form a composite stack, wherein the ultrasonic welding device connects the composite plies by increasing their tackiness; and transferring the composite stack to a compression molding device and forming a composite article from the composite stack with the compression molding device.

17. The method of claim 16 further comprising delivering the composite plies to the ultrasonic welding device via a transfer arm.

18. The method of claim 16 further comprising stabilizing one or more of the composite plies prior to radiating the composite plies with the ultrasonic welding device.

19. The method of claim 16, wherein the two or more of the composite plies are radiated at a predetermined location of the composite plies and are connected at the predetermined location.

20. The method of claim 16 further comprising generating a composite preform from the composite stack via a forming device.

* * * * *